(12) United States Patent
Furlong

(10) Patent No.: US 9,274,865 B2
(45) Date of Patent: Mar. 1, 2016

(54) IMPLEMENTING ENHANCED BUFFER MANAGEMENT FOR DATA STORAGE DEVICES

(71) Applicant: HGST Netherlands B.V., Amsterdam (NL)

(72) Inventor: Jeffrey L. Furlong, Irvine, CA (US)

(73) Assignee: HGST Netherlands B.V., Amsterdam (NL)

( * ) Notice: Subject to any disclaimer, the term of this patent is extended or adjusted under 35 U.S.C. 154(b) by 93 days.

(21) Appl. No.: 13/957,411

(22) Filed: Aug. 1, 2013

(65) Prior Publication Data

US 2015/0039824 A1 Feb. 5, 2015

(51) Int. Cl.
*G06F 12/08* (2006.01)
*G06F 11/00* (2006.01)

(52) U.S. Cl.
CPC ............ *G06F 11/00* (2013.01); *G06F 12/0868* (2013.01); *G06F 12/0895* (2013.01)

(58) Field of Classification Search
None
See application file for complete search history.

(56) References Cited

U.S. PATENT DOCUMENTS

| | | | |
|---|---|---|---|
| 6,412,045 B1 * | 6/2002 | DeKoning et al. | ............ 711/135 |
| 7,809,886 B2 | 10/2010 | Ashmore et al. | |
| 8,195,901 B2 | 6/2012 | Harper et al. | |
| 8,289,801 B2 | 10/2012 | Smith et al. | |
| 2012/0239852 A1 | 9/2012 | Calvert et al. | |
| 2012/0239853 A1 | 9/2012 | Moshayedi | |
| 2014/0133220 A1 * | 5/2014 | Danilak et al. | ................ 365/158 |

* cited by examiner

*Primary Examiner* — Duc Doan
(74) *Attorney, Agent, or Firm* — Joan Pennington

(57) ABSTRACT

A method, apparatus and a data storage device for implementing enhanced buffer management for storage devices. An amount of emergency power for the storage device is used to determine a time period for the storage device between emergency power loss and actual shut down of electronics. A time period for the storage device for storing write cache data to non-volatile storage is used to identify the amount of write cache data that can be safely written from the write cache to non-volatile memory after an emergency power loss, and using the write cache threshold for selected buffer management techniques for providing enhanced storage device performance, including enhanced SSD or HDD performance.

20 Claims, 8 Drawing Sheets

IMPLEMENTING ENHANCED BUFFER MANAGEMENT FOR DATA STORAGE DEVICES

FIELD OF THE INVENTION

The present invention relates generally to the data storage field, and more particularly, relates to a method, apparatus and a data storage device for implementing enhanced buffer management for storage devices.

DESCRIPTION OF THE RELATED ART

A data storage device, such as one or more solid state drives (SSDs) or one or more hard disk drives (HDDs) often includes a buffer manager to achieve high performance levels.

Often a buffer manager is used to temporarily store commands and data to and from the storage device. For read commands, space is allocated in a cache in the buffer manager so that a read being processed has a temporary destination before being returned to a host computer. If data in read cache is lost, the host computer can reissue the read.

For write commands, host data is temporarily stored in a cache in the buffer manager until the host data can be sent to the storage device. The cache is volatile memory, such as dynamic random access memory (DRAM) or static random access memory (SRAM). In write cache the host is told that the write command has been completed even though it has not been completed when the data is still in a volatile DRAM or volatile SRAM. If data in write cache is lost there can be coherency or data issue as a result. For this reason, some users turn off write cache for storage devices.

During an emergency power loss or unexpected power loss (UPL), the SSD or HDD must place the data in the write buffer, which is volatile DRAM or volatile SRAM, into non-volatile flash or magnetic disk memory storage before all electricity is exhausted. The prior art arrangement uses both capacitors and kinetic energy of the spinning media stack to power these last microsecond writing activities. High performance SSDs and HDDs often require a large number of capacitors for unexpected power loss events.

A need exists to provide an effective and efficient mechanism for implementing enhanced buffer management for storage devices, such as solid state drives (SSDs) or hard disk drives (HDDs). It is desirable to provide improved SSD or HDD performance while minimizing the number of capacitors in the storage device design, with smart buffering techniques.

SUMMARY OF THE INVENTION

Aspects of the present embodiments are to provide a method, apparatus and a data storage device for implementing enhanced buffer management for storage devices. Other important aspects of the present embodiments are to provide such method, apparatus and data storage device substantially without negative effect and that overcome some of the disadvantages of prior art arrangements.

In brief, a method, apparatus and a data storage device are provided for implementing enhanced buffer management for storage devices. An amount of emergency power for the storage device is used to determine a time period for the storage device between emergency power loss and actual shut down of electronics. A time period for the storage device for storing write cache data to non-volatile storage is used to identify the amount of write cache data or write cache threshold that can be safely written from the write cache to non-volatile memory after an emergency power loss, and using the write cache threshold for selected buffer management techniques for providing enhanced storage device performance.

BRIEF DESCRIPTION OF THE DRAWINGS

The present embodiments together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

In accordance with features of the preferred embodiments, a method, apparatus and a data storage device are provided for implementing enhanced buffer management for storage devices. Selected buffer management techniques are used for providing enhanced SSD or HDD performance.

Figure 1:
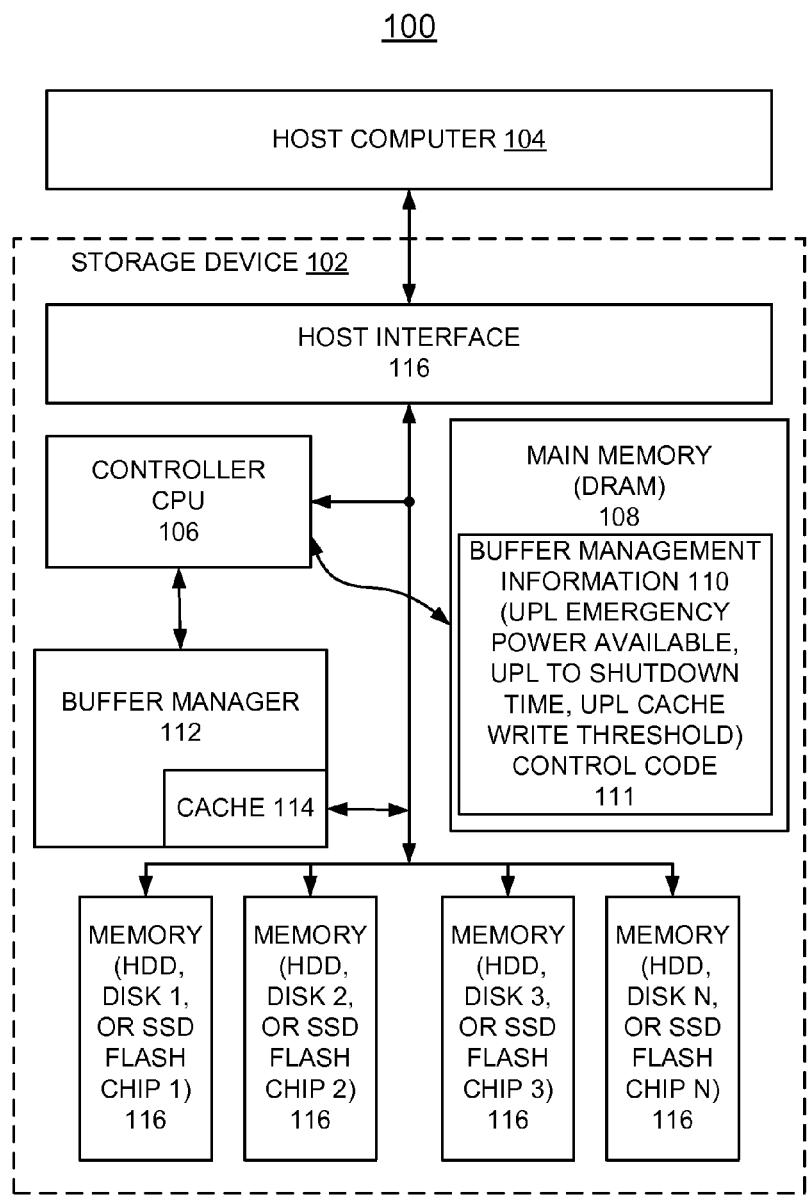
FIG. 1 is a block diagram representation illustrating a system for implementing enhanced buffer management for storage devices in accordance with an example embodiment.

Having reference now to the drawings, in FIG. 1, there is shown an example system for implementing enhanced buffer management for storage devices, for example, for solid state drives (SSDs) or hard disk drives (HDDs) generally designated by the reference character 100 in accordance with a preferred embodiment. System 100 includes a storage device 102, solid state drive (SSD) or hard disk drive (HDD), and a host computer 104.

Storage device 102 includes a controller 106 coupled to a main memory or dynamic random access memory (DRAM) 108, memory management information 110 and control code 111. Controller 106 is coupled to a buffer manager 112 including volatile memory or cache 114, such as dynamic random access memory (DRAM) or static random access memory (SRAM).

Storage device 102 includes a plurality of memory devices 116 coupled to the cache 114, buffer manager 112 and controller 106, such as a HDD disks 1-N or, for example, SSD flash chips 1-N. Storage device 102 includes a host interface 116 coupled between the host computer 104, and the controller 106, the cache 114, buffer manager 112 and the memory devices 116.

In accordance with features of the invention, the stored memory management information 110 is used with control code 111 of a preferred embodiment including an unexpected power loss (UPL) emergency power available, a UPL to shut-down time, and a UPL cache write threshold. The UPL emergency power available is the amount of emergency power available for the storage device between emergency power loss and actual shut down of electronics. The UPL emergency power available is used to determine a first time period for the storage device between emergency power loss and actual shut down of electronics. A second time period for the storage device for storing write cache data to non-volatile storage is used to identify the amount of write cache data that can be safely written from the write cache to non-volatile memory after an emergency power loss.

System 100 is shown in simplified form sufficient for understanding the present invention. For example, the controller 106 and buffer manager 112 can be fabricated on one or multiple integrated circuit dies, and suitably programmed to implement methods in accordance with preferred embodiments.

Storage device 102 implements enhanced buffer management in accordance with embodiments. The firmware or control code 111 of controller 106 is given the stored memory management information 110 for implementing enhanced buffer management for storage device 102.

It should be understood that the enhanced buffer management implemented example embodiment of system 100 advantageously are applied to various types of data storage devices.

Referring now to FIGS. 2, 3, 4, and 5, there are shown respective flow charts illustrating example operations of the system of FIG. 1 for implementing enhanced buffer management for storage devices, for example, for solid state drives (SSDs) and/or hard disk drives (HDDs) in accordance with preferred embodiments.

Figure 2:
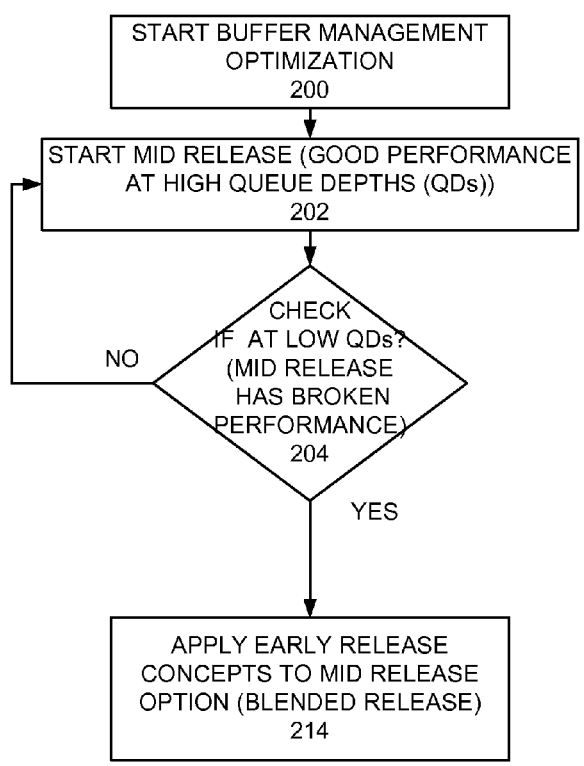
FIGS. 2, 3, 4, and 5 are respective flow charts illustrating example operations of the system of FIG. 1 for implementing enhanced buffer management for storage devices, for example, for solid state drives (SSDs) and hard disk drives (HDDs) in accordance with preferred embodiments.

In FIG. 2, buffer management optimization starts as indicated in a block 200. A mid release option is started as indicated in a block 202, which provides good performance at high queue depths (QDs). Checking if at low queue depths (QDs), where the mid release option has broken performance, is performed as indicated in a decision block 204. If at low queue depths (QDs), then early release concepts are applied to the mid release option or blended release as indicated in a block 206. Example blended release operations are illustrated and described with respect to FIG. 3. If not at low queue depths (QDs), then operations go back to block 202 with mid release option performed.

Figure 3:
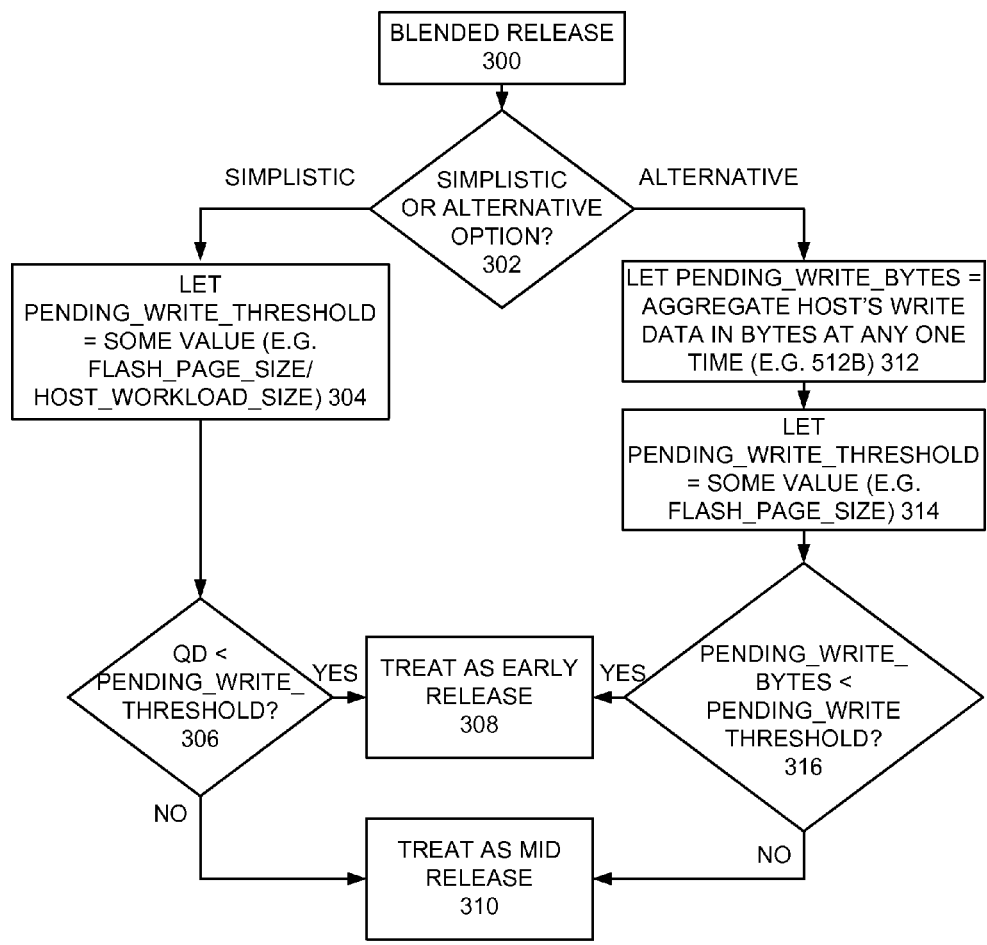
Figure 4:
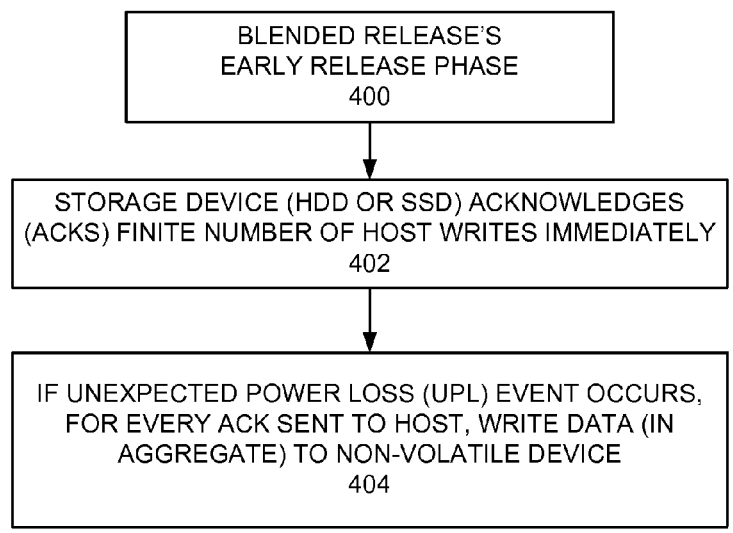

In FIG. 3, blended release operations start as indicated in a block 300. Deciding between a simplistic blended release option and an alternative blended release option is performed as indicated in a decision block 302. When the simplistic blended release option is identified, then the pending_write_threshold is set equal to some value, for example, the flash_page_size/ host_workload_size as indicated in a block 304. Checking if the queue depth (QD) is less than the pending_write_threshold is performed as indicated in a decision block 306. If so, then the blended release option is treated as early release as indicated in a block 308. If the queue depth (QD) is not less than the pending_write_threshold, then the blended release option is treated as mid release as indicated in a block 310.

When the alternative blended release option is identified, then the pending_write_bytes are set equal to aggregate host's write data in bytes at any one time, for example, 512B as indicated in a block 312. Then the pending_write_threshold is set equal to some value, for example, the flash_page_size, as indicated in a block 314. Checking if the pending_write_bytes are less than the pending_write_threshold is performed as indicated in a decision block 316. If so, then the blended release option is treated as early release at block 308. If the pending write bytes are not less than the pending_write_threshold, then the blended release option is treated as mid release at block 310. start here In FIG. 4, blended release's early release phase operations start as indicated in a block 400. As indicated in a block 402, the storage device acknowledges (ACKS) finite number of host writes immediately as indicated in a block 402. As indicated in a block 404, if an unexpected power loss (UPL) event occurs, for every ACK sent to the host, data is written to the non-volatile memory 116, such as HDD disk or SSD flash storage. This data write to memory 116 in system 100 may require some padding, but UPL events are expected to be rare. This data write to memory 116 requires stored energy from UPL emergency power for writing one or a few flash_page_size writes to the non-volatile memory 116. With a conventional early release operation of buffer cache, stored energy is required for potentially hundreds of flash_page_size writes to non-volatile memory. Also stored energy is required in system 100 to finish any current non-volatile memory writes.

Figure 5:
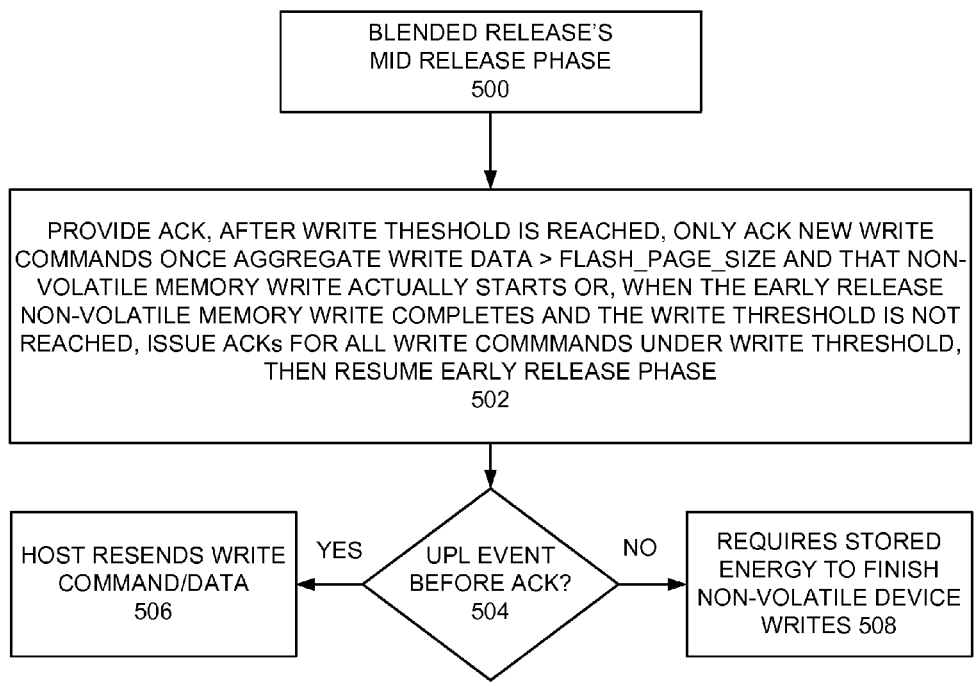

In FIG. 5, blended release's mid release phase operations start as indicated in a block 500. As indicated in a block 502, an ACK is provided or sent to the host after a write threshold is reached, then only ACK new write commands one aggregate write data is greater than the flash_page_size and the write to non-volatile memory actually starts. At block 502, an ACK is sent to the host after the early release non-volatile memory write completes and the write threshold is not reached, then ACKs are issued for all write commands under the write threshold, then resuming early release phase. As indicated in a decision block 504, checking UPL event before ACK is performed. If the UPL event is before ACK, host resends write command/data as indicated in a block 506. If the UPL event is not before ACK, stored energy is required in system 100 to finish non-volatile memory writes as indicated in a block 508.

Figure 6A:
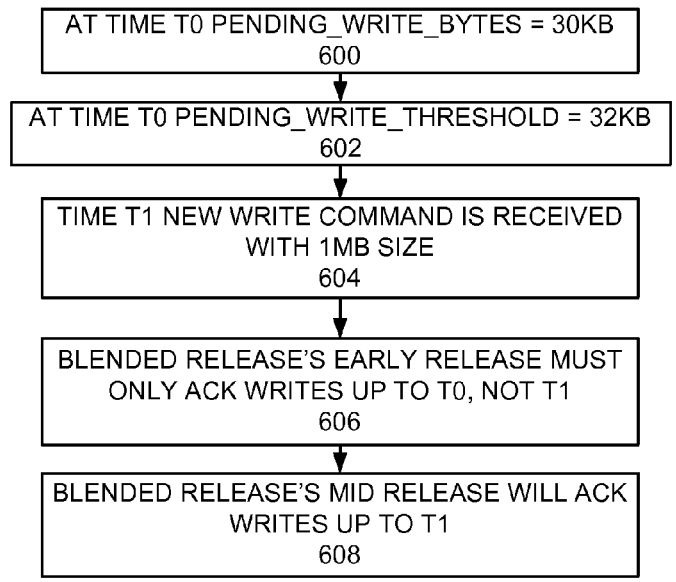
FIGS. 6A, 6B, and 6C respectively illustrate example blended release operations in accordance with preferred embodiments.
Figure 6B:
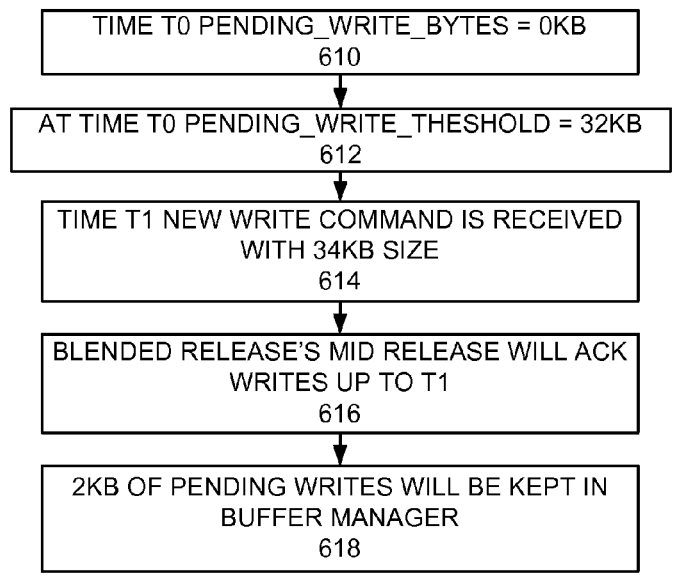
Figure 6C:
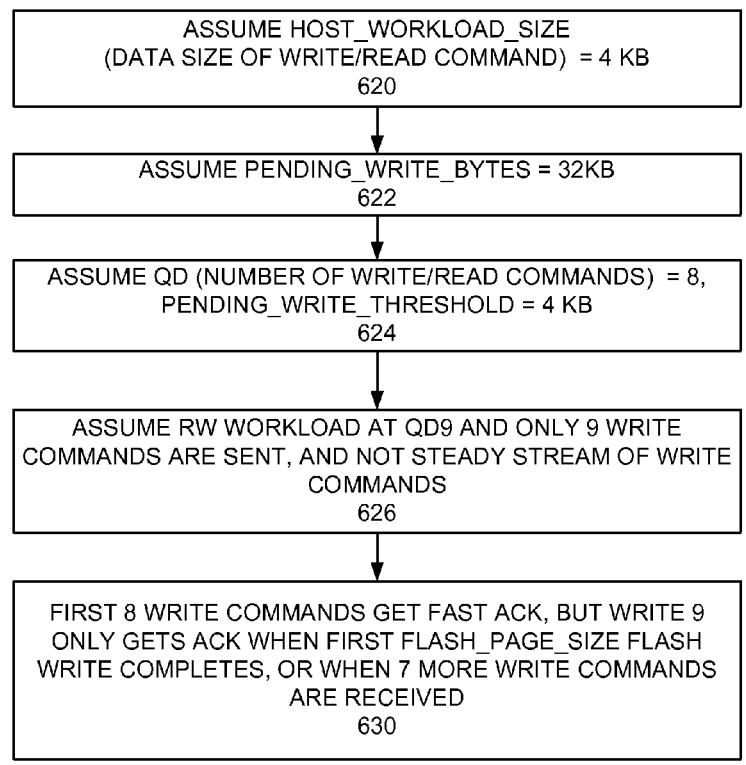

Referring now to FIGS. 6A, 6B, and 6C, there are shown respective example blended release operations in accordance with preferred embodiments. indicated in a block 608.

In the example blended release operations of FIG. 6A, as indicated in a block 600, assume at time T0 pending_write_bytes is equal to 30 KB. Also assume at time T0 pending_write_threshold is equal to 32 KB as indicated in a block 602. As indicated in a block 604, assume at time T1 a new write command is received with a 1 MB size. The blended release's early release phase will ACK writes up to time T0, not T1 as indicated in a block 606. The blended release's mid release phase will ACK writes up to time T1 as indicated in a block 608.

In the example blended release operations of FIG. 6B, as indicated in a block 610, assume at time T0 pending_write_bytes is equal to 0 KB. Also assume at time T0 the pending_write_threshold is equal to 32 KB as indicated in a block 612. As indicated in a block 614, assume at time T1 a new write command is received with a 34 KB size. The blended release's mid release phase will ACK writes up to time T1 as indicated in a block 616. Then 2 KB of pending writes will be kept in buffer manager as indicated in a block 618.

In accordance with features of the preferred embodiments, for low queue depths (QDs) within the write threshold, blended release operations can achieve early release performance. For queue depths (QDs) just larger than the write threshold, mid release performance may be the same or less than early release performance.

In the example blended release operations of FIG. 6C, as indicated in a block 620, assume the host_workload_size, data size of write/read command, is equal to 4 KB. As indicated in a block 622, assume the pending_write bytes is equal to 32 KB. As indicated in a block 624, assume the QD is equal to 8, the number of write/read commands, and the pending_write_threshold is equal to 4 KB. As indicated in a block 626, assume a random write (RW) workload at QD9 and only 9 write commands are sent, and not steady stream of write commands. Then as indicated in a block 630, the first 8 write commands get fast ACK when first flash_page_size write completes, or when 7 more write commands are received. The assumption is that at QD9, or other QD by changing QD, pending_write_threshold, host will not stop sending write commands for long duration of time.

As queue depths (QDs) increase, mid release performance and early release performance converge. Also blended release operations of the preferred embodiments have no impact on Garbage Collection (GC), while GC may have a small impact on blended release. For example, the most realistic workload is Random Mixed read/write (RM), so at a QD of X, Y (<=X) commands will be writes, where the example blended release operations of FIG. 6C has low total Input/Output Operations Per Second (IOPS) if only 9 commands sent and all are Random Write (RW). The example blended release operations of FIG. 6C would have better IOPS if only 9 commands sent with random distribution of reads/writes. The example blended release operations of FIG. 6C would have even better IOPS if only 9 commands sent with higher distribution of reads over writes, which is characteristic of a typical RM workload.

Figure 7:
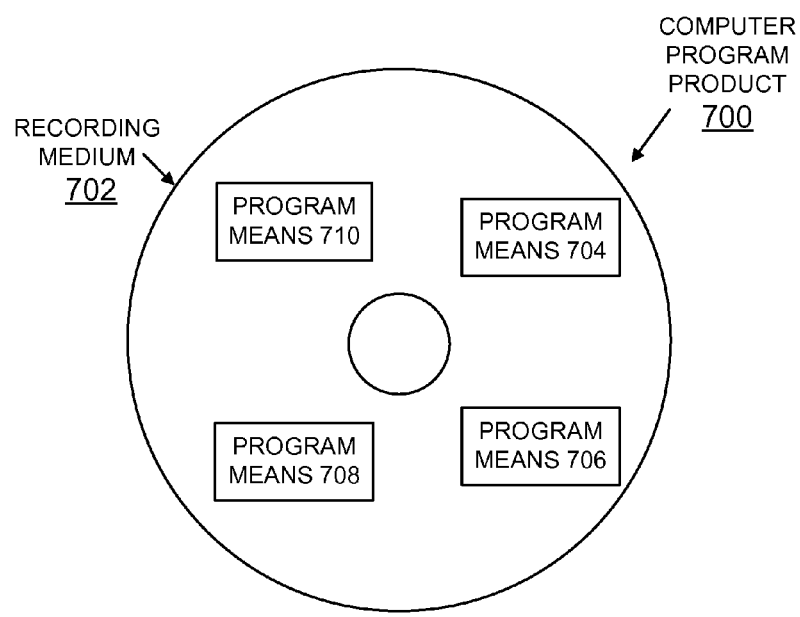
FIG. 7 is a block diagram illustrating a computer program product in accordance with preferred embodiments.

Referring now to FIG. 7, an article of manufacture or a computer program product 700 is illustrated. The computer program product 700 includes a computer readable recording medium 702, such as, a floppy disk, a high capacity read only memory in the form of an optically read compact disk or CD-ROM, a tape, a solid state storage device, or another similar computer program product. Computer readable recording medium 702 stores program means or control code 704, 706, 708, 710 on the medium 702 for carrying out the methods for implementing enhanced buffer management of preferred embodiments in the system 100 of FIG. 1.

A sequence of program instructions or a logical assembly of one or more interrelated modules defined by the recorded program means or control code 704, 706, 708, 710, direct SSD controller 106 of the system 100 for implementing enhanced buffer management of preferred embodiments.

While the present invention has been described with reference to the details of the embodiments shown in the drawing, these details are not intended to limit the scope of the invention as claimed in the appended claims.

What is claimed is:

1. A method for implementing enhanced buffer management of a write cache for storage devices comprising:
   identifying a first time period available for the storage device between emergency power loss and actual shut down of electronics using an amount of emergency power for the storage device;
   identifying a second time period for the storage device for storing write cache data to non-volatile storage;
   identifying a pending write threshold of write cache data safely written from the write cache to non-volatile memory after an emergency power loss, and
   using said identified pending write threshold for write cache data for optimizing buffer management for providing enhanced storage device performance including selectively providing acknowledges of host write commands.

2. The method for implementing enhanced buffer management as recited in claim 1 wherein the storage devices include one of solid state drives (SSDs) and hard disk drives (HDDs).

3. The method for implementing enhanced buffer management as recited in claim 1 wherein using said identified pending write threshold for write cache data for optimizing buffer management for enhanced storage device performance includes providing a blended release's early release phase.

4. The method for implementing enhanced buffer management as recited in claim 3 wherein providing a blended release's early release phase includes identifying pending write bytes less than said pending write threshold.

5. The method for implementing enhanced buffer management as recited in claim 3 wherein providing a blended release's early release phase includes providing an acknowledge (ACK) immediately for a finite number of host writes.

6. The method for implementing enhanced buffer management as recited in claim 5 includes for each ACK sent writing write cache data from the write cache to non-volatile memory after an emergency power loss.

7. The method for implementing enhanced buffer management as recited in claim 1 wherein using said identified pending write threshold for write cache data for optimizing buffer management for enhanced storage device performance includes providing a blended release's mid release phase.

8. The method for implementing enhanced buffer management as recited in claim 7 wherein providing a blended release's mid release phase includes identifying pending write bytes greater than or equal to said identified pending write threshold.

9. The method for implementing enhanced buffer management as recited in claim 7 wherein providing a blended release's mid release phase includes providing an acknowledge (ACK) after said identified pending write threshold of host writes is reached, aggregate write data is greater than a flash_page_size, and a non-volatile write starts.

10. The method for implementing enhanced buffer management as recited in claim 9 includes finishing the non-volatile memory write after an emergency power loss after an acknowledge (ACK) is sent.

11. The method for implementing enhanced buffer management as recited in claim 7 wherein providing a blended release's mid release phase includes providing an acknowledge (ACK) for all write commands under said write threshold, after blended release's early release phase write completes, and the said identified pending write threshold of host writes is not reached.

12. An apparatus for implementing enhanced buffer management of a write cache for storage devices comprising:
   a controller;
   a memory coupled to said controller storing buffer management information for the storage device; said buffer management information including an amount of emergency power for the storage device, a first time period available for the storage device between emergency power loss and actual shut down of electronics, and a second time period for the storage device for storing write cache data to non-volatile memory storage,
   a buffer manager coupled to said controller including a volatile cache for storing write cache data;
   said controller identifying a pending write threshold of write cache data safely written from the volatile cache to non-volatile memory storage after an emergency power loss, and
   said controller using said identified pending write threshold for write cache data for optimizing buffer management for providing enhanced storage device performance including selectively providing acknowledges of host write commands.

13. The apparatus as recited in claim 12 wherein the storage devices include one of solid state drives (SSDs) and hard disk drives (HDDs).

14. The apparatus as recited in claim 12 includes control code stored on a computer readable medium, and wherein said controller uses said control code for optimizing buffer management.

15. The apparatus as recited in claim 12 wherein said controller using said identified pending write threshold for write cache data for optimizing buffer management for enhanced storage device performance includes said controller providing a blended release's early release phase responsive to identifying pending write bytes less than said identified pending write threshold.

16. The apparatus as recited in claim 15, includes said controller providing an acknowledge (ACK) immediately for a finite number of host writes, and for each ACK sent writing write cache data from the write cache to non-volatile memory after an emergency power loss.

17. The apparatus as recited in claim 12, wherein said controller using said identified threshold for write cache data for optimizing buffer management for enhanced storage device performance includes said controller providing a blended release's mid release phase responsive to identifying pending write bytes greater than or equal to the pending said write threshold.

18. A data storage device comprising:
a controller;
a memory coupled to said controller storing buffer management information for the storage device; said buffer management information including an amount of emergency power for the storage device, a first time period available for the storage device between emergency power loss and actual shut down of electronics, and a second time period for the storage device for storing write cache data to non-volatile storage,
a non-volatile memory storage;
a buffer manager coupled to said controller including a volatile cache for storing write cache data;
said controller identifying a pending write threshold of write cache data safely written from the volatile cache to non-volatile memory storage after an emergency power loss, and
said controller using said identified pending write threshold for write cache data for optimizing buffer management for providing enhanced storage device performance including selectively providing acknowledges of host write commands.

19. The data storage device as recited in claim 18, wherein the storage device include one of a solid state drive (SSD) and a hard disk drive (HDD).

20. The data storage device as recited in claim 18 includes control code stored on a computer readable medium, and wherein said controller uses said control code for optimizing buffer management.

* * * * *